United States Patent
Harker et al.

(10) Patent No.: US 7,162,474 B1
(45) Date of Patent: Jan. 9, 2007

(54) RECIPIENT CONTROLLED CONTACT DIRECTORIES

(75) Inventors: Andrew N Harker, Bishops Stortford (GB); Alan Wilkinson, Saffron Walden (GB)

(73) Assignee: Nortel Networks Limited (CA)

( * ) Notice: Subject to any disclaimer, the term of this patent is extended or adjusted under 35 U.S.C. 154(b) by 393 days.

(21) Appl. No.: 09/852,995

(22) Filed: May 10, 2001

(51) Int. Cl.
G06F 17/30 (2006.01)
G06F 17/00 (2006.01)

(52) U.S. Cl. .............................................. 707/9; 707/10

(58) Field of Classification Search ......... 707/1–104.1; 709/102, 103, 200, 203, 230, 232, 340, 240, 709/206, 10, 320, 23; 370/229, 235, 329; 379/93.09, 93.11, 100.17, 100.171
See application file for complete search history.

(56) References Cited

U.S. PATENT DOCUMENTS

| | | | |
|---|---|---|---|
| 3,816,668 A | 6/1974 | Giesken | 379/273 |
| 4,602,129 A | 7/1986 | Matthews et al. | 379/88.26 |
| 4,740,788 A | 4/1988 | Konneker | 340/7.27 |
| 5,197,092 A | 3/1993 | Bamburak | 379/211 |
| 5,200,994 A | 4/1993 | Sasano et al. | 379/142 |
| 5,206,901 A | 4/1993 | Harlow et al. | 379/211 |
| 5,283,856 A * | 2/1994 | Gross et al. | 706/47 |
| 5,373,549 A | 12/1994 | Bales et al. | 379/93.21 |
| 5,432,841 A | 7/1995 | Rimer | 455/457 |
| 5,608,786 A | 3/1997 | Gordon | 370/352 |
| 5,652,789 A | 7/1997 | Miner et al. | 379/201 |
| 5,696,900 A | 12/1997 | Nishigaya | 709/229 |
| 5,737,011 A | 4/1998 | Lukacs | 348/14.09 |
| 5,742,668 A | 4/1998 | Pepe et al. | 455/415 |
| 5,742,905 A | 4/1998 | Pepe et al. | 455/461 |
| 5,768,513 A | 6/1998 | Kuthyar et al. | 709/204 |
| 5,802,253 A * | 9/1998 | Gross et al. | 706/47 |
| 5,870,549 A * | 2/1999 | Bobo, II | 709/206 |
| 5,896,128 A | 4/1999 | Boyer | 715/716 |
| 5,917,489 A * | 6/1999 | Thurlow et al. | 345/809 |
| 5,946,386 A | 8/1999 | Rogers et al. | 379/265 |
| 5,951,638 A * | 9/1999 | Hoss et al. | 709/206 |
| 5,974,465 A * | 10/1999 | Wong | 709/234 |
| 6,006,253 A | 12/1999 | Kumar et al. | 709/204 |
| 6,021,428 A * | 2/2000 | Miloslavsky | 709/206 |
| 6,023,762 A | 2/2000 | Dean et al. | 713/193 |
| 6,058,178 A | 5/2000 | McKendry et al. | 379/212 |
| 6,094,681 A * | 7/2000 | Shaffer et al. | 709/224 |
| 6,101,531 A * | 8/2000 | Eggleston et al. | 709/206 |

(Continued)

FOREIGN PATENT DOCUMENTS

WO    WO 99/34628    7/1999

OTHER PUBLICATIONS

Nortel Networks, Nortel's Leadership Drive in Wireless Internet, Nortel's Technology Perspectives, Monday, Oct. 19, 1998, 11 Pages, Corporate and Technology Communications, Ottawa, Canada.

(Continued)

*Primary Examiner*—Don Wong
*Assistant Examiner*—Linh Black
(74) *Attorney, Agent, or Firm*—McGuinness & Manaras LLP

(57) ABSTRACT

A presence system 4 manages communications in a network 2 between initiating parties 8 and recipient parties 6. The system 4 has a database 10 storing entries each relating to recipient parties 6. Each entry is stored according to a unique identifier assigned to the corresponding recipient party 6 and includes at least one rule specifying the manner of communications between the corresponding recipient party 6 and an initiating party 8.

25 Claims, 2 Drawing Sheets

U.S. PATENT DOCUMENTS

| | | | | |
|---|---|---|---|---|
| 6,104,799 | A | 8/2000 | Jain et al. | 379/211 |
| 6,147,977 | A * | 11/2000 | Thro et al. | 370/265 |
| 6,148,328 | A | 11/2000 | Cuomo et al. | 709/204 |
| 6,157,945 | A * | 12/2000 | Balma et al. | 709/206 |
| 6,175,858 | B1 * | 1/2001 | Bulfer et al. | 709/206 |
| 6,185,565 | B1 | 2/2001 | Meubus et al. | 707/10 |
| 6,243,398 | B1 | 6/2001 | Kahane et al. | 370/522 |
| 6,243,714 | B1 | 6/2001 | Shapiro et al. | 707/201 |
| 6,247,043 | B1 * | 6/2001 | Bates et al. | 709/200 |
| 6,286,029 | B1 | 9/2001 | Delph | 709/203 |
| 6,301,339 | B1 | 10/2001 | Staples et al. | 379/93.01 |
| 6,301,609 | B1 * | 10/2001 | Aravamudan et al. | 709/207 |
| 6,310,947 | B1 * | 10/2001 | Polcyn | 379/211.01 |
| 6,330,317 | B1 | 12/2001 | Garfinkel | 379/196 |
| 6,333,973 | B1 * | 12/2001 | Smith et al. | 379/88.12 |
| 6,350,066 | B1 * | 2/2002 | Bobo, II | 709/206 |
| 6,356,934 | B1 | 3/2002 | Delph | 709/204 |
| 6,360,252 | B1 * | 3/2002 | Rudy et al. | 709/206 |
| 6,370,233 | B1 | 4/2002 | Bennett, III et al. | 379/137 |
| 6,397,259 | B1 * | 5/2002 | Lincke et al. | 709/236 |
| 6,404,762 | B1 * | 6/2002 | Luzeski et al. | 370/352 |
| 6,424,841 | B1 | 7/2002 | Gustafsson | 455/466 |
| 6,430,604 | B1 * | 8/2002 | Ogle et al. | 709/207 |
| 6,437,818 | B1 * | 8/2002 | Ludwig et al. | 348/14.09 |
| 6,438,583 | B1 * | 8/2002 | McDowell et al. | 709/206 |
| 6,438,585 | B1 * | 8/2002 | Mousseau et al. | 709/206 |
| 6,445,694 | B1 * | 9/2002 | Swartz | 370/352 |
| 6,457,060 | B1 | 9/2002 | Martin et al. | 709/245 |
| 6,510,461 | B1 | 1/2003 | Nielsen | 709/224 |
| 6,564,321 | B1 | 5/2003 | Bobo, II | 713/168 |
| 6,584,314 | B1 | 6/2003 | Haumont et al. | 455/435.1 |
| 6,594,354 | B1 | 7/2003 | Kelly | 379/201.1 |
| 6,606,647 | B1 * | 8/2003 | Shah et al. | 709/206 |
| 6,609,128 | B1 * | 8/2003 | Underwood | 707/10 |
| 6,628,194 | B1 | 9/2003 | Hellebust et al. | 340/7.5 |
| 6,807,423 | B1 | 10/2004 | Armstrong et al. | 455/440 |
| 2002/0114431 | A1 | 8/2002 | McBride et al. | 379/88.21 |
| 2002/0120696 | A1 * | 8/2002 | Mousseau et al. | 709/206 |

OTHER PUBLICATIONS

One page photo copy of a newspaper article. Financial Times Jun. 9, 1999, "How to stay in touch and keep stress at a distance".

12 pages downloaded from http//:ww.icq.com on Aug. 11, 1999, "ICQ Site Guide".

4 pages downloaded form http://messenger.msn.com on Aug. 11, 1999, "MSM Messenger Service".

3 pages downloaded form http://ww.generalmagic.com on Aug. 11, 1999, "General Magre—Portico".

5 pages downloaded from http/www.wildfire.com on Aug. 11, 1999, "Wildfire Resume".

7 pages downloaded from http://www.oz.com/pulse, Aug. 1999, "iPulse".

2 pages downloaded from http://www.lucent.com on Apr. 6, 2000 comprising a press release date Jun. 9, 1999.

Guido Appenzeller et al., The Mobile People Architecture, Technical Report: CSL-TR-00000, Jan. 1999, 13 pages.

G. Mohr et al., PIP-DEMO: An Interoperable Presence Information Protocol, Aug. 1998, 16 pages.

Shingo Fujimoto et al., IDentity Infrastructure Protocol (IDIP) Aug. 6, 1998, 20 pages.

Bhaskaran Raman et al, The Iceberg Project: Defining the IP and Telecom Intersection, IT Pro Nov. 1999, 8 pages.

S. Aggarwal, et al., Presence Information Protocol Requirements, Aug. 7, 1998, 4 pages.

Martin Calsyn, Rendezvous Protocol, Nov. 21, 1997, 21 pages.

Calsyn & Dusseault, Presence Information Protocol Requirements, Feb. 9, 1998, 13 pages.

Rosenberg et al., SIP For Presence, Nov. 13, 1998, 18 pages.

Anthonoy D. Joseph et al., The Case for Services over Cascaded Networks, Oct. 30, 1998, 9 pages.

David G. Boyer et al, The Personal Presence System—A Wide Area Network Resource for the Real Time Composition of Multipoint Multimedia Communications, Oct. 1994, 8 pages, pp. 453-460.

Mark Day et al., Instant Messaging/Presence Protocol Requirements, Aug. 13, 2003, 19 pages.

Keith Pleas, The Evolution of NT-DCOM in NT 5.0, Windows & Net Magazine Network, Sep. 1996, 2 pages.

* cited by examiner

RECIPIENT CONTROLLED CONTACT DIRECTORIES

TECHNICAL FIELD

The invention relates to communications between parties, and in particular to a system and method facilitating a recipient party to control such communications. The invention also relates to a directory for use in such communications.

BACKGROUND TO THE INVENTION

Many people now have various different communication devices at their disposal, such as, for example, so-called plain old telephone service (POTS) devices, mobile telephone devices, personal computers (PC) and hand-held computers. This variety of devices may complicate communications to the extent that, in order to communicate with a recipient party, an initiating party needs to know what devices the recipient party has, which of those devices is currently active and an address or location mechanism for each device. In other words, the initiating party needs to know about what is termed "the presence" of the recipient party.

Directories are available, particularly through the Internet, which provide contact details for individuals. However, the sheer number of these directories can be a problem, both from the point of view of data entry/maintenance and from the point of view of searching for a contact. Moreover, according to how widespread the contact details are to be disseminated and to whom they will be available, there may be a reluctance on the part of a contact to use a directory, or to use it to only a limited extent, because, for instance, of security concerns and the value which included details may have; for example, the addresses may be used for the purpose of compiling sales targetting lists. Allied to this is the fact that the contacts have no control over the use of details and whilst, on the one hand, they may wish to make them available in the interest of promoting communications, they may at the same time potentially expose themselves to unwanted contacts. This, as much as anything, is borne out of the fact that the contact has little if any control over existing communication routes, such as POTS or postal services. For such routes, there may be only two opposite extreme choices for the contact: either the valuable details are given out or they are withheld altogether. For example, not placing a telephone number in a telephone directory is an option, but legitimate initiating parties are then hampered from making contact. The purpose of a directory is undermined if it is not comprehensive and definitive. The problems associated with directories also apply to other instances in which someone may provide contact details, such as with a publication.

OBJECT OF THE INVENTION

An object of the invention is to improve communications between parties. Another object of the invention is to give the recipient party control over such communications.

SUMMARY OF THE INVENTION

According to a first aspect, the invention provides a presence system comprising a database storing a plurality of entries each relating to a recipient party, wherein each entry is stored according to a unique identifier assigned to the corresponding recipient party and each entry includes at least one rule specifying a manner of communications between the corresponding recipient party and an initiating party, wherein the system manages communications between an initiating party and a recipient party according to the or each appropriate rule.

The presence system according to the first aspect of the invention effectively acts as an intermediary between an initiating party and a recipient party. Within the system, each recipient party enters contact details, of the type typically entered into a contact directory, but access to the details is controlled by the system. According to the identity of the initiating party, the details may or may not be released, or only certain details may be released. The dissemination of details is controlled according to the or each rule entered for the initiating party concerned. Therefore, the recipient party is given control over details disclosed such that they are more inclined to include details of themselves, thereby enabling the directory to be comprehensive and definitive. Moreover, the unique identifier is issued as an address for the recipient party, but it has no value in the sense that it does not enable an initiating party to make direct contact with the corresponding recipient party, merely to direct a request to communicate to the system, which then invokes the or each relevant rule specifying the manner of communication between the initiating and recipient parties. Thus, again, control over the communications rests with the recipient party.

Typically, the presence system may be realised as a server connected to an appropriate network, with the server hosting the database. Interaction between an initiating party and the database may be in the same way as interaction with an Internet web site and the server may generate data which various different initiating party Internet enabled devices may process. Alternatively, associated closely with the server may be a data conversion module for converting data from an initiating party device into a form which the server may process, and for converting data from the server into a form which the initiating party device may process. For instance, the module may comprise an analogue to digital conversion module, say, for voice to HTML conversion. In response to a request from an initiating party to communicate, the server may generate data which, when processed at an initiating party device, results in the opening of a communications application. Alternatively, the data may result in one or more instructions or notifications at the initiating party device. The data is dictated by the or each rule in the relevant recipient party entry for the initiating party requesting to communicate.

Initially, a recipient party will access the system to request inclusion on the database. Having been accepted for inclusion, a recipient party will be provided with a security mechanism, such as password, for accessing the database entry relating to them. They can then enter and maintain contact and other details contained in their entry.

The database may be queried by an initiating party and, in response to a query, the database may return the unique identifier. The query may take the form of use of known recipient party details which the database may compare with contact details it contains. A query may take the form of use of the unique identifier to obtain other details about the corresponding recipient party. The database may return the details in accordance with the or each rule for the initiating party which may specify whether and, if so, what information should be disclosed to the recipient party.

Each entry may include details of the communication devices at the disposal of the corresponding recipient party, and the or each rule may specify to which device communications from an initiating party should be directed. The system may periodically notify known initiating parties of their status in relation to the recipient party, that is, which recipient party device is available for communicating at that time.

Each entry may include details of know initiating parties, and there may be at least one rule specified for each known initiating party as well as a default rule for every other initiating party.

According to a second aspect, the invention provides a method of communicating between an initiating party and a recipient party comprising assigning to the recipient party a unique identifier and making at least one rule specifying the manner of communications between an initiating party and the recipient party, wherein the unique identifier is used to direct a request for communications from an initiating party to a system which manages communications between the initiating party and the recipient party in accordance with the or each rule.

According to a third aspect, the invention provides a directory comprising a plurality of entries each relating to a recipient party, wherein each entry is stored according to a unique identifier assigned to the corresponding recipient party and each entry includes at least one rule specifying a manner of communications between the corresponding recipient party and an initiating party.

According to a fourth aspect, the invention provides a directory comprising a plurality of entries each relating to a recipient party, wherein each entry is stored according to a unique identifier assigned to the corresponding recipient party and each entry includes at least one rule specifying which details from the entry may be disclosed to an initiating party.

DESCRIPTION OF THE INVENTION

Figure 1:
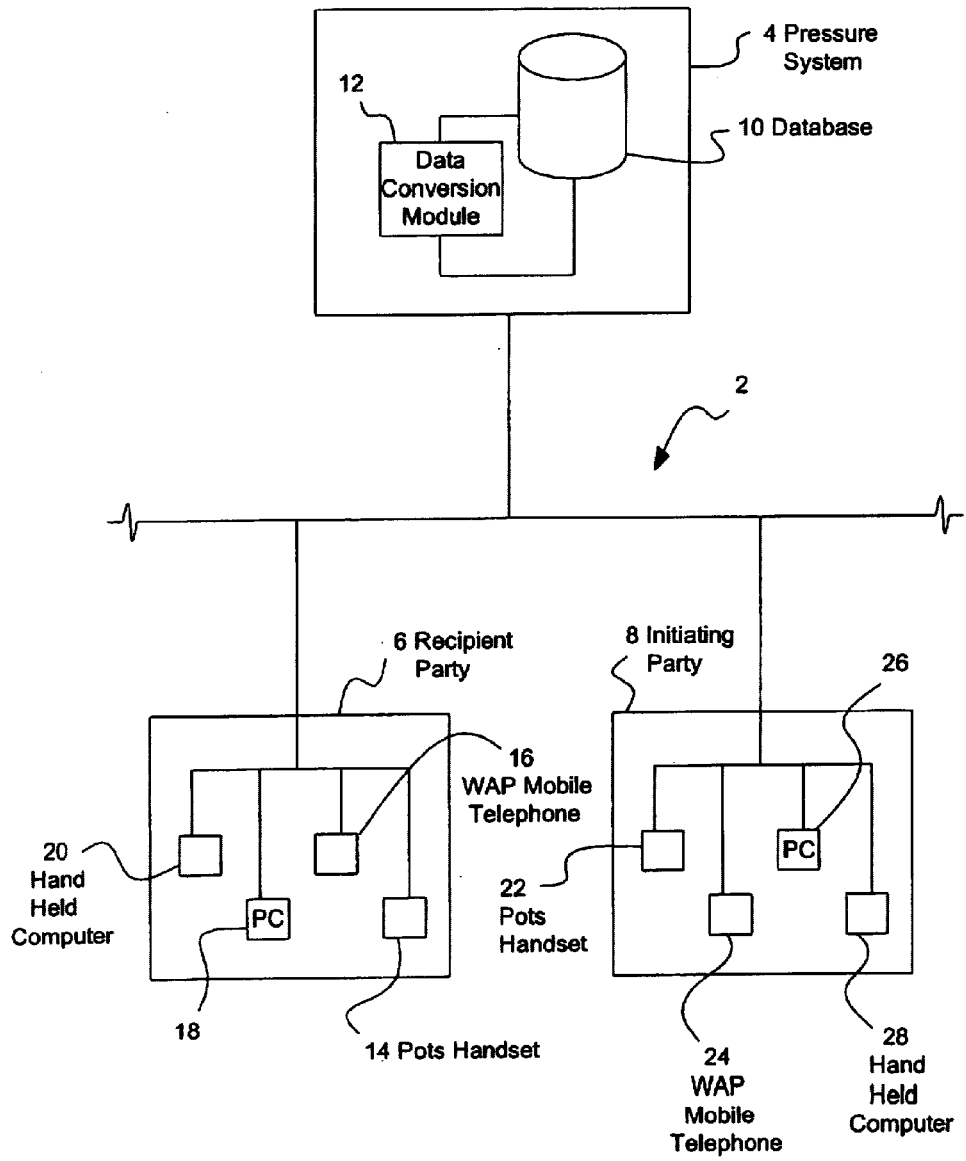
FIG. 1 is a schematic diagram of a communications network to which a presence system according to one aspect of the invention is connected.

With reference to FIG. 1, connected to a communications network 2 is a presence system 4. The system 4 comprises a server hosting a database 10. Also connected to the network 2 are a recipient party 6 and an initiating party 8.

Figure 2:
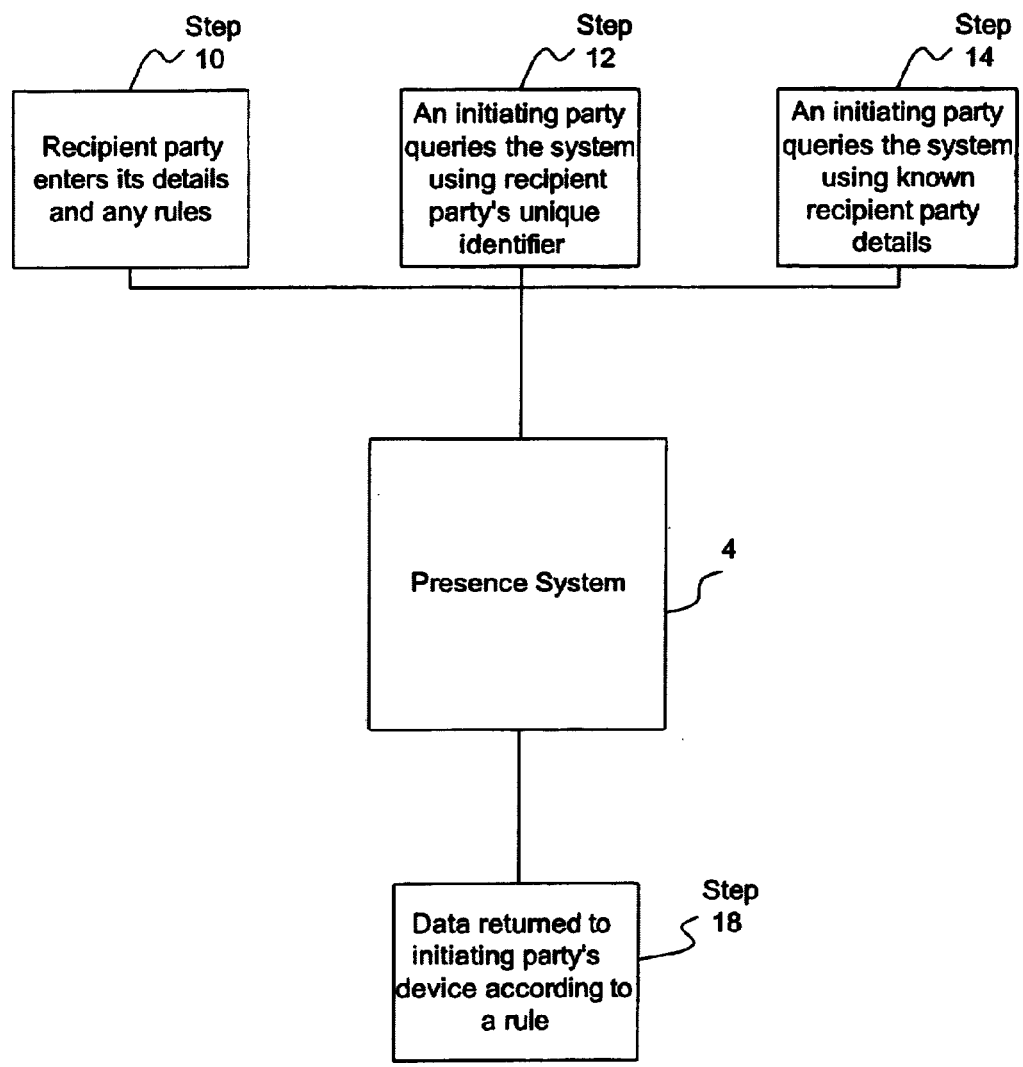
FIG. 2 is a schematic diagram of a method of communicating using a presence system.

The system 4 is accessible in the manner of an Internet web site. Using a suitable Internet enabled device, any recipient party 6 may apply for use of the system 4. Stored within the database 10 are a plurality of entries each relating to a recipient party. At the time of acceptance for inclusion in the database 10, the system 4 assigns to each recipient party a unique identifier typically of the form name.for.individual @ presence.system.location.address. The prefix of the identifier is used as the key field in the database 10 for each entry, that is, the entry is stored according to the prefix and, subsequently, the prefix is used to access the relevant entry. Once accepted for inclusion, a recipient party may access their entry for details entry and for maintenance and updating purposes as illustrated in Step 10 of FIG. 2.

Each entry includes details typically stored in contact directories such as name, address, telephone number, occupation, nationality, hobbies etc or any other details which enables a recipient party to be identified.

Each recipient party 6 may have several communication devices, all capable of connecting to the network 2, such as a POTS handset 14, a WAP mobile telephone 16, a PC 18 and a hand held computer 20. At any one time, primarily according to location and activity, one of more of the devices 14, 16, 18, 20 may be active for contacting the recipient party 6. Each recipient party 6 enters into their entry the details of the various devices 14, 16, 18, 20 they have available. A recipient party 6 may continually update their entry as to which device is currently active.

Each recipient party 6 may enter into their entry the identity of a number of known initiating parties 8. Against each initiating party, one or more rules may be entered, specifying the manner of communications between each known initiating party 8 and the recipient party 6, such as the device though which the initiating party may contact the recipient party, the form of the communication within the options available through the device, such as, for example, voice or text messaging, and the timeframe within which the rule is to apply. In other words, the rules enable the recipient party 6 to control how any initiating party communicates 8 with them. The recipient party 6 may also specify default rules applicable to all unknown initiating parties 8. The system 4 periodically communications to each known initiating party its status in relation to the recipient party Individual rules may be altered at any time according to changes of circumstances affecting individual initiating parties 8 or may be globally altered, say, to account for circumstances which affect all initiating parties 8 such as unavailability due to illness.

Each initiating party 8 may have several communication devices, all capable of connecting to the network 2, such as a POTS handset 22, a WAP mobile telephone 24, a PC 26 and hand held computer 28. An initiating party 8 will fall into one of two categories: Either it will know the unique identifier for the recipient party 6, and it may use this to make contact with the recipient party as illustrated in Step 12 of FIG. 2; or it may determine the unique identifier using the contact information it has available, such as name, address occupation etc. as illustrated in Step 14 of FIG. 2.

The process of determining the unique identifier involves an initiating party 8 accessing and querying the system 4. In the event that the initiating party 8 wishes to communicate using the PC 26, a WAP mobile telephone 24, a hand held computer 28 or any other Internet enabled device, the system 4 is accessed in the manner of accessing a web site. In response, a search page is downloaded to the device 24, 26, 28. The page includes various blank boxes or input ports into which the initiating party 8 may insert query criteria, that is, what it knows of the recipient party's personal details. The system 4 will return any matches, possibly more than one according to the specificity of the query criteria. In the case of multiple matches, there will be an option to select one of the or further to hone the query criteria. One or more matches may be stored in a communications application loaded on to the device 24, 26, 28 for later use. Alternatively, a match may be used straight away. Use may be on a "click to call" basis with the unique identifier presented as a link on a further downloaded page. From information stored within the device 24, 26, and 28 the identity of the initiating party 8 is sent to the system 4. The identity is compared with the identities of known initiating parties 8 included in the recipient party's entry. If a known initiating party is determined, the communication rules applicable to that party are invoked. If the initiating party is unknown, the default rules are invoked. Data is returned to the initiating party's device 24, 26, 28 according to the invoked rules as illustrated in step 18 of FIG. 2.

The data may result in the opening at the initiating party's device 24, 26, 28 of the communications application appropriate to the manner of communication dictated by the rule. For example, if the rule applicable to that subscriber at this particular time is "communicate by e-mail", the data may be processed at the subscriber device, resulting in an e-mail application, being opened: A message window may be automatically generated, made ready with the appropriate address. Once the message has been composed, it is sent. The recipient party 6 can, as with any other e-mail message, choose how to receive the message, that is, it could be downloaded as text or "listened to" via a text to audio conversion mechanism of the type now widely available.

Alternatively, the data may result in the opening of an SMS text managing application at the initiating party device 24, 26, 28, which enables the initiating party 8 to dispatch a text message to the recipient party.

Further alternatively, at least in the case that the initiating party is using a PC 26 or WAP mobile telephone 24, the data may result in the opening of a voice calling application. The voice call may be directed to the current voice calling device 14, 16, 18, 20 of the recipient party or may be directed to a voice mail message caching facility, for later access.

In the event that the initiating party 8 is using a POTS device 22, access to the directory server may be gained by dialling into a data conversion module 12 acting as a voice to data conversion facility. This enables the recipient party search criteria to be input verbally. This is achieved through a series of verbal prompts which the facility 12 puts to the initiating party 8. The unique identifier for the recipient party 6 is either relayed to the initiating party verbally, say for it to use with an alternative device, or the facility 12 gives verbal prompts of further actions such as "press 1 to call, press 2 to store". A "call" response relays the identity of the initiating party 8 to the system 4. The identity is compared with the identities for the known subscribers stored in the recipient party's entry and the appropriate communication rules are invoked. If the rule is to communicate by voice, the initiating device 22 is connected to the specified voice device 14, 16, 18, 20 of the recipient party 6. If the rule is to communicate by non-voice, the voice recognition facility 12 translates a message spoken by the initiating party 8 into data and relays the data to the specified device 16, 18, 20 of the recipient party 6.

The invention claimed is:

1. A presence system comprising:
   (a) a database storing a plurality of entries each relating to a recipient party, each entry being stored according to a unique identifier assigned to the corresponding recipient party,
   (b) at least one rule included in each entry, specifying a manner of communications between the corresponding recipient party and an initiating party, and
   (c) an initiating party interface arranged to cooperate with an initiating party's communications device to cause communications application software appropriate to the manner of communications specified in said rule to automatically execute at the initiating party's device, wherein the system manages communications between an initiating party and a recipient party according to each appropriate rule and, in response to a connection request from an initiating party, the server generates data which, when processed at an initiating party device, results in the automatic execution of communications application software, the communications application software determining the manner of communication between the initiating party and the recipient party.

2. A presence system according to claim 1 wherein the presence system comprises a server hosting the database.

3. A presence system according to claim 2 wherein interaction between an initiating party and the database is in the manner of interaction with an internet web site.

4. A presence system according to claim 3 wherein the server generates data processable by an internet enabled device.

5. A presence system according to claim 2 wherein associated with the server is a data conversion module for converting data from an initiating party device into a form which the server may process, and for converting data from the server into a form which the initiating party device may process.

6. A presence system according to claim 4 wherein, in response to a request from an initiating party to communicate, the server generates data which, when processed at an initiating party device, results in at least one instruction or notification.

7. A presence system according to claim 4 wherein the data is dictated by each rule in the relevant recipient party entry for the initiating party requesting to communicate.

8. A presence system according to claim 1 wherein a security mechanism is provided for secure access by a recipient party to their entry.

9. A presence system according to claim 1 wherein, in response to a query from an initiating party, the database returns the unique identifier.

10. A presence system according to claim 1 wherein, in response to a query from an initiating party, the database returns details about a recipient party.

11. A presence system according to claim 10 the database returns details in accordance with each rule for the querying initiating party.

12. A presence system according to claim 1 wherein each entry includes details of each communication device at the disposal of the corresponding recipient party, and each rule specifies to which device communications from an initiating party should be directed.

13. A presence system according to claim 1 wherein each entry includes details of known initiating parties, and there is at least one rule specified for each known initiating party as well as a default rule for every other initiating party.

14. A method of communicating between an initiating party and a recipient party comprising:—
   (a) assigning a unique identifier to the recipient party,
   (b) making at least one rule specifying the manner of communications between an initiating party and the recipient party, and
   (c) causing communications application software appropriate to the manner of communications specified in said rule to automatically open at an initiating party's device,
wherein the unique identifier is used to direct a request for communications from an initiating party to a system which manages communications between the initiating party and the recipient by generating data in accordance with each rule processing the data at an initiating party device results in the automatic execution of communications application software; the communications application software determining the manner of communication between the initiating party and the recipient party.

15. A method according to claim 14 wherein the initiating party queries the system for the unique identifier.

16. A method according to claim 15 wherein the initiating party queries the system using known details of the recipient party.

17. A method according to claim 14 wherein the initiating party queries the system for other details relating to a recipient party.

18. A method according to claim 14 wherein processing data at an in initiating party device results in a notification or instruction at the initiating party device.

19. A method according to claim 14 wherein the system comprises a database and the unique identifier is used to locate an entry relating to a recipient party contained in the database.

20. A method according to claim 19 wherein the recipient party enters contact details into the entry.

21. A method according to claim 19 wherein the recipient party enters details of the communications devices into the entry.

22. A method according to claim 19 wherein the recipient party enters details of known initiating parties into the entry.

23. A method according to claim 19 wherein the recipient party enters into the entry at least one rule for each known initiating party and a default rule for any other initiating parties.

24. A method according to claim 14 wherein data to and from an initiating party and a recipient party is converted from one form to another.

25. A method according to claim 14 wherein data is converted to and from a form which an initiating party and the system respectively can process.

* * * * *